United States Patent [19]

Stupp

[11] Patent Number: 5,229,474
[45] Date of Patent: Jul. 20, 1993

[54] SYNTHESIS OF TWO-DIMENSIONAL POLYMERS BY MOLECULAR RECOGNITION AND CHEMICAL REACTION AMONG HIGH MOLAR MASS MONOMERS

[75] Inventor: Samuel I. Stupp, Champaign, Ill.

[73] Assignee: The Board of Trustees of the University of Illinois, Urbana, Ill.

[21] Appl. No.: 672,478

[22] Filed: Mar. 20, 1991

[51] Int. Cl.[5] ............................................. C08F 20/70
[52] U.S. Cl. .................... 526/298; 526/273; 526/313; 526/320
[58] Field of Search ............... 526/299, 313, 273, 298

[56] References Cited

U.S. PATENT DOCUMENTS

| 3,882,084 | 5/1975 | Tato | 526/299 X |
| 4,696,990 | 9/1987 | Noonan | 526/304 |
| 5,057,339 | 10/1991 | Ogawa | 427/340 |

FOREIGN PATENT DOCUMENTS 1234414  9/1989  Japan .

OTHER PUBLICATIONS

X. J. Hong et al. (1989) Polymer Preprints 30(2), 469.
D. M. Walba et al. (1986) J. Am. Chem. Soc. 108, 5210–5221.
CA112:56817v.
A. Singh et al (1986) Polym Preprints 27(2), 393–394.

Primary Examiner—Joseph L. Schofer
Assistant Examiner—M. Nagumo
Attorney, Agent, or Firm—Marshall, O'Toole, Gerstein, Murray & Borun

[57] ABSTRACT

A new variety of side chain liquid crystal polymers. The macromolecules of these materials are comb-shaped and differ from conventional side-chain liquid crystal polymers in that the comb's teeth are longer and semi flexible. The oligomeric side chains contain a long flexible spacer not only at their junction with the backbone but also in the center of the mesogen. Specific features of the systems include monosubstitution of enantiotopic protons in the central spacer by a cyano group and a long alkoxy tail at the terminus. An unusual property of these materials is a lower liquid crystal-isotropic transition temperature relative to that of their monomeric precursors.

8 Claims, 1 Drawing Sheet

SYNTHESIS OF TWO-DIMENSIONAL POLYMERS BY MOLECULAR RECOGNITION AND CHEMICAL REACTION AMONG HIGH MOLAR MASS MONOMERS

The present invention relates to a method for making two-dimensional polymers by bulk polymerization of an appropriate monomer, and to the two-dimensional polymer formed thereby.

BACKGROUND AND SUMMARY OF THE INVENTION

In accordance with the present invention, there are prepared two-dimensional polymers from monomers that satisfy the following three conditions: (1) they react in ordered configurations, (2) they have more than one reactive group, and (3) they have at least one terminus free of reactive groups. The monomers useful in the invention contain polymerizable, e.g., acrylate, groups and chiral functions, e.g., nitrile, that can undergo rapid thermal polymerization in the isotropic molten state to yield a product which forms smectic phases of high thermal stability. Based on spectroscopic evidence, phase behavior, and solubility characteristics, the reaction products are two-dimensional polymers which can be described as molecular sheets. The two-dimensional polymers form because two independent polymerization reactions can be thermally activated among the monomers in locally ordered configurations. These ordered configurations result from the aggregation or alignment of monomers by molecular recognition. If only a single polymerization reaction were to occur, a "comb" polymer, i.e., a single backbone polymer chain having pendent side chains, and not a two-dimensional polymer, would form. On the other hand, if both polymerizations were activated among monomers in disordered configurations, the product of the reaction would be an insoluble crosslinked gel. Also, if both reactive chemical functions were situated at the termini of the monomer molecules, the product would also be a crosslinked, three-dimensional gel.

BRIEF DESCRIPTION OF DRAWINGS

The invention will be better understood from the description which follows and from the accompanying drawings, in which.

DESCRIPTION OF PREFERRED EMBODIMENTS

Figure 1:
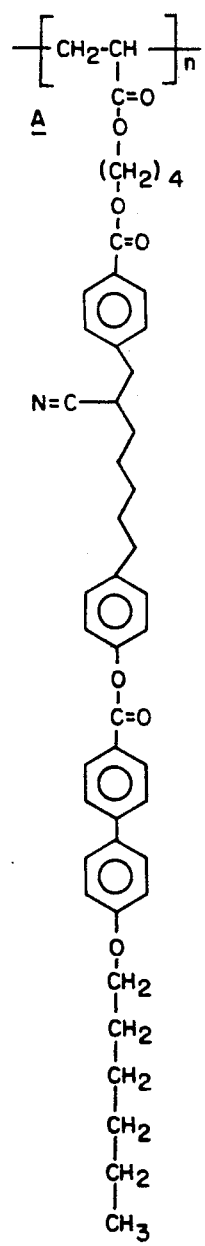
FIGS. 1 and 2 show some schematic structures illustrating the formation of the two-dimensional polymers.

FIG. 1 shows a suitable monomer for making two-dimensional polymers in accordance with the invention. The polymer has a vinyl group at one end (A) thereof, which is shown as having been polymerized with other similar groups to form a backbone chain

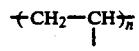

in which the side chains containing a nitrile (—CN) group are substituted. The nitrile group in this monomer serves as both an affinity group for achieving an ordered configuration among the side chains and a reactive group for forming covalent bonds among adjacent side chains.

Figure 2:
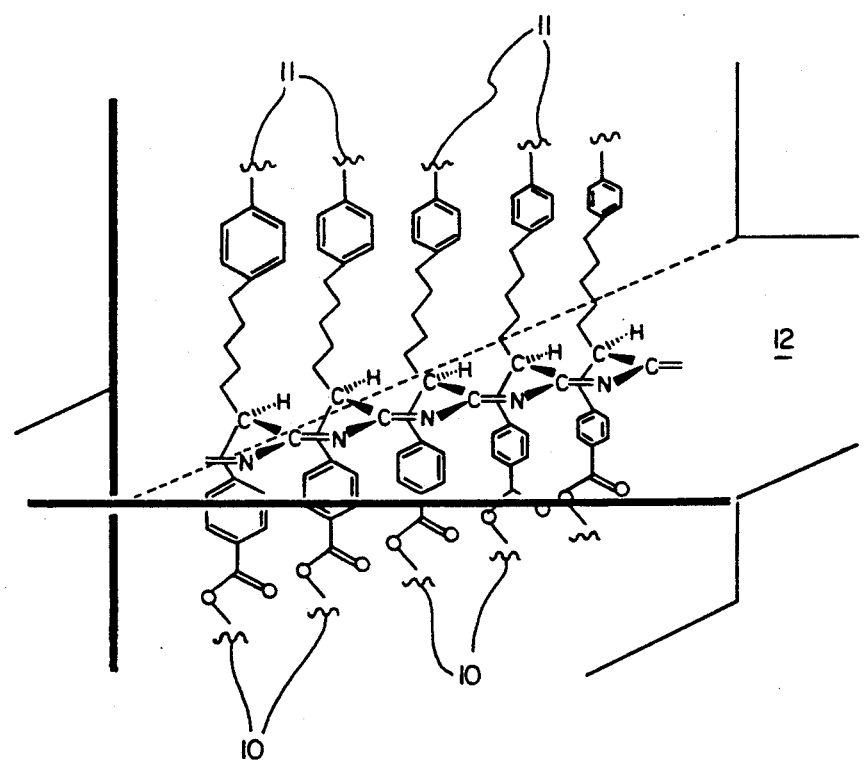

Shown in FIG. 2 is a section of a two-dimensional polymer formed after the nitrile groups in the structure of FIG. 1 have reacted. The lower ends 10 of the molecules are attached to the backbone chain shown schematically in FIG. 1, while the upper ends 11 are free. In this figure, the nitrile groups have reacted to form a two-dimensional rigid polyimine structure lying essentially within plane 12. The polymerization of the acrylate groups at the lower ends of the side chains provides the "double stitching" necessary to form a two-dimensional sheet.

As used herein, an "affinity" group refers to a chemical group or structure within a monomer molecule that causes the monomers to align in an ordered configuration even in the isotropic molten state, thereby permitting reactive groups present in the side chains to react. If all of the monomers are identical, the bonds, which are created by the reaction, will exist in one or more spaced planes.

Examples of suitable affinity groups for use in the invention include the following:

(1) groups containing biphenyl moieties;

(2) groups containing a chiral center, i.e., a stereospecific carbon substituted by a structure having a strong dipole moment, examples of which are -CN, a halogen, $CF_3$, or (3) a saturated carbon chain flanked by aryl groups, e.g.,

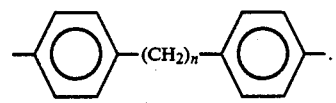

Alternatively, the stereospecific carbon can be substituted by an ionic pair, e.g., $-A+B^-$ where A and B represent elements or chemical groups joined by ionic bonds.

A two-dimensional polymer in accordance with the invention comprises distinct planar sets of intermolecular bonds, i.e., a first set of intermolecular bonds in a planar surface (not shown in FIG. 2), corresponding to the vinyl backbone of FIG. 1, with pendant groups aligned generally orthogonally to the planar surface, and a second set of intermolecular bonds in a second planar surface spaced apart from the first planar surface.

The polymer can be prepared by thermal bulk polymerization of molten linear monomer units having affinity groups, such as a stereogenic center, a mesogenic group, or a highly hydrophobic or hydrophilic group, and two or more spaced apart polymerizable or reactive groups, e.g., a vinyl group, acrylate or methacrylate group, epoxide group, nitrile group, or a group capable of generating free radicals, such as a benzylic group, not more than one of said groups being at a terminus of the molecule. The affinity groups promote self-assembly of the molten monomer units to allow aligned polymerization or reaction of the various groups in planar spaces, e.g., acrylate polymerization in one plane, and nitrile reaction in a second plane spaced from the first.

The resulting two-dimensional polymer is a planar structure with a thickness defined by double the length of the monomer unit if a polymerizable group is at a terminus of the monomer unit and equal to the length of the monomer if no reactive group is at a terminus. Unlike three-dimensional bonded crosslinked polymers or gels, the two-dimensional polymer is soluble and exhibits thermoplastic, as well as thermotropic behavior, e.g., it can exhibit liquid crystal polymer properties.

The two-dimensional polymer is unlike a Langmuir-Blodgett film that may have reactive pendant groups from one polymer bonding surface. The two-dimensional polymer of the invention is prepared by polymerization in bulk of an appropriate monomer. The two-dimensional nature of the product arises from the particular configuration of the monomer molecules during reaction. By contrast, a Langmiur-Blodgett film is prepared by positioning the monomer in a layer one molecule thick before the polymerization reaction occurs.

In a specific embodiment, the present invention involves the polymerization of monomers having nitrile groups situated toward the center of the monomer molecule to form a rigid polyimine structure. The "double stitching" necessary to complete the formation of molecular sheets is provided by the polymerization of acrylate groups present at the termini of the monomer molecules. The smectic phases formed by the two-dimensional polymers undergo a sharp isotropization transition at approximately 240° C., a transition which occurs at a temperature which is 140° C. higher than that of the monomer (which also forms smectic phases).

PREPARATION OF TWO-DIMENSIONAL POLYMERS

A suitable monomer for the preparation of these polymers has the structure shown in FIG. 1. The preparation of the monomer is shown below.

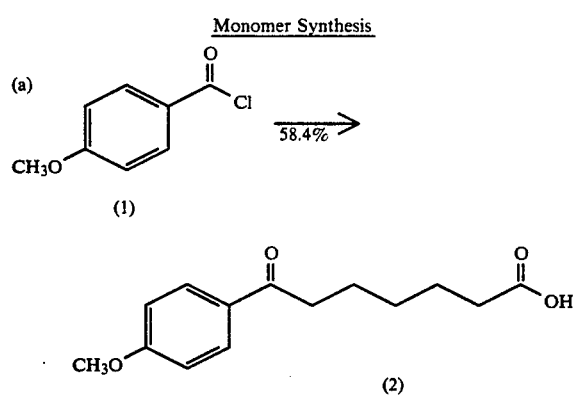

To a dry flask, charged with 150 ml of chloroform, was added dry Et₃N (90 ml) and 1-morpholino-1-cyclohexene, followed by addition of p-anisoyl chloride (1) (100 g in 120 ml of chloroform) over 30 minutes and external cooling was applied to maintain the solution temperature below 35° C. Stirring was continued for 12 hours. The solution was extracted with brine (saturated NaCl) and water, and the organic layer was dried (MgSO₄). After removing solvent, the concentrated mixture was dissolved in dioxane (375 ml), concentrated HCl (150 ml), glacial acetic acid (300 ml) and water (450 ml). The mixture was refluxed vigorously for 30 hours. After cooling in the freezer, the resulting solid was collected by filtration. It was then taken up in hot 1N NaOH solution (600 ml). After cooling, the solution was acidified with concentrated HCl and product (2) was collected.

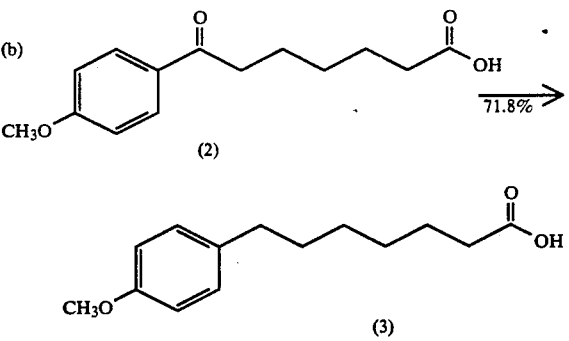

A flash was charged with compound (2) (2.76 g), diethylene glycol (15 ml), and 85% hydrazine hydrate (5 ml). The mixture was heated 3.5 hours at 120° C. The flask was cooled to 60° C. and aspirator vacuum applied for 2 hours during which time the bath temperature was raised to 130° C. The temperature was again lowered and KOH pellets (3.9 g) were added. The mixture was heated to 155° C. and maintained at this temperature for 2 hours. After cooling to room temperature, the solid was stirred with water (20 ml) and acidified with concentrated HCl. The solid was collected after refrigeration and washed with water. The remaining solid was taken up in acetone and the insoluble material filtered off. The acetone was removed to leave a solid product (3).

A flask was charged with compound (3) (20 g), 48% HBr (80 ml), and glacial acetic acid (40 ml). The mixture was heated to reflux for 3.5 hours. At the end of this time, water (80 ml) was added, the flask was cooled to room temperature, and placed in the freezer overnight. The resulting solid (4) was collected and washed with water.

A flask was charged with ethanol (100 mg). The flask was placed in a water bath to provide external cooling and anhydrous HCl gas was bubbled through the ethanol until the weight of the flask increased by 35 g to afford 25% (by weight) solution of HCl in ethanol.

A flask was charged with compound (4) (16.6 g), 35 ml of the 25% HCl solution and ethanol. The mixture was heated to reflux and maintained at this temperature for 4.5 hours. After cooling to room temperature, the contents were poured into ice water (750 ml) and 375 ml of saturated NaHCO₃. The mixture was extracted with ether, followed by removing solvent to leave an oily product (5).

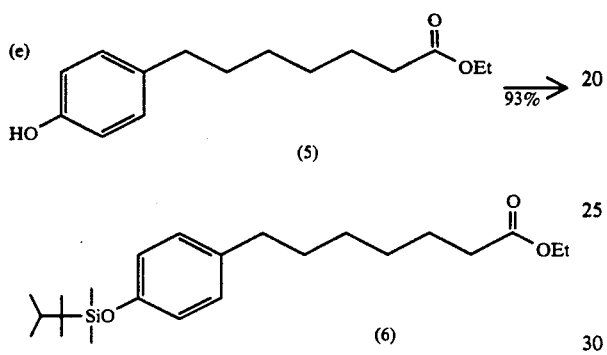

A flash was charged with compound (5) (26.5 g), CH₂Cl₂ (180 ml), dimethylaminopyridine (3.2 g), and dry triethylamine (18 ml). Dimethylthexylsilyl chloride (24.6 ml) was then added at room temperature. The mixture was stirred overnight, and pentane (180 ml) was added and the solid was removed by filtration through a 40 g pad of silica gel. The solvent was removed and the crude product (6) was purified by flash column chromatography (50% CH₂Cl₂ in petroleum ether).

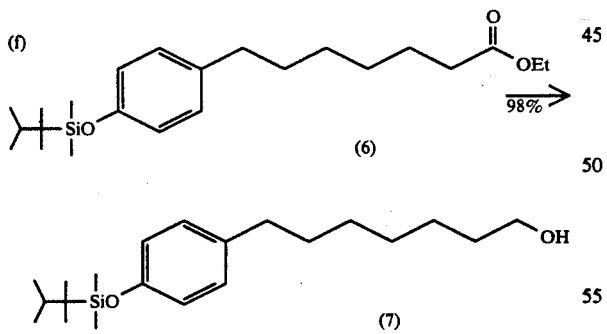

To a flask charged with lithium aluminum hydride was added 180 ml of dry ether, followed by addition of compound (6) dissolved in 170 ml of ether. The mixture was briefly refluxed by external heating and then cooled to 0° C. 3.0 ml of water, 15% KOH solution (3.0 ml) and 9 ml of water were added in succession, followed by refluxing to complete hydrolysis (10 minutes). After cooling, the solid was removed, and the solvent was removed by evaporation to give an oily product (7).

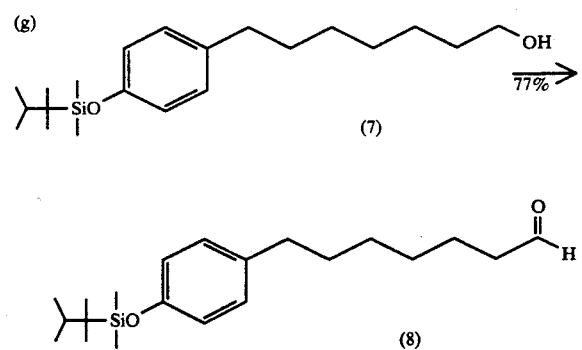

To a flask charged with pyridinium chlorochromate and dry CH₂Cl₂ was added 25 g of compound (7) dissolved in 25 ml of CH₂Cl₂ with vigorous stirring. Vigorous stirring was continued for 2 hours at room temperature, then 155 ml of dry ether was added, and the dark mixture was allowed to stand for 10 minutes. The liquid was decanted, and the tar-like residue was washed with ether again using mechanical stirring, followed by decanting of the ether layer. The decanted liquids were combined and filtered through a pad of celite. The crude product was purified by flash column chromatography (9% EtOAC in petroleum ether). Evaporation of the solvent gave an oily product (8).

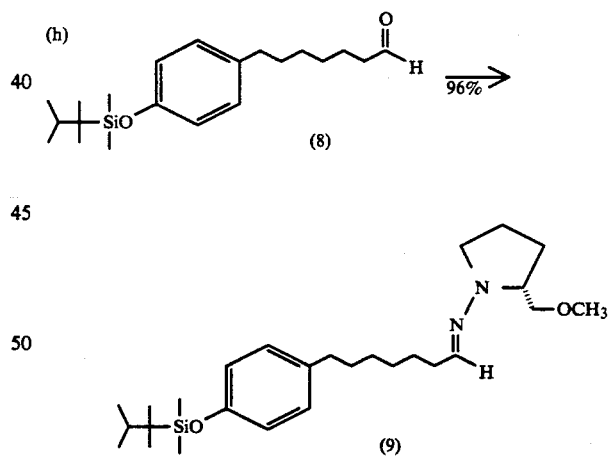

To a flask charged with 4.8 g of RAMP (R-1-amino-2-methoxymethyl pyrrolidine) or SAMP (the derivative of opposite configuration) was added compound (8) at 0° C., and the contents were stirred at room temperature for 2 hours. At this point, 80 ml of ether was added along with Na₂SO₄ (90 g) and the mixture was stirred 30 minutes further. The product (9) was separated by column chromatography (10% EtOAC in petroleum ether).

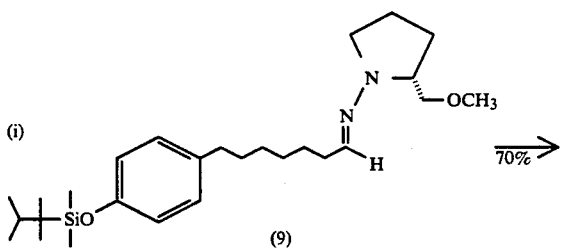

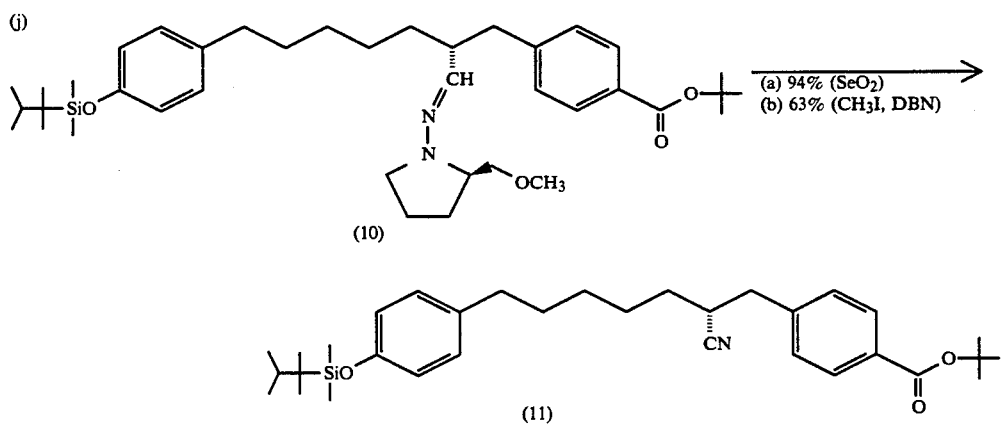

4-(α-bromotoluate) (1.55 g) in THF (2.6 ml) was added dropwise via cannula. Stirring at −95° C. was continued 1 hour and during this time the color faded to a light orange-yellow. The temperature was allowed to gradually warm to −20° C. over the next 2 hours, and the solution was extracted with ether (90 ml) and 0.5M NaHCO₃ (36 ml). The product (10) was purified by flash column chromatography (CH₂Cl₂→10% diethylether in CH₂Cl₂).

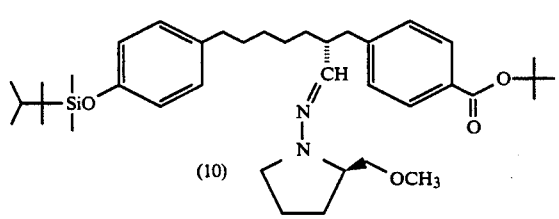

A flask was cooled to −78° C. and charged with THF (9.8 ml), diisopropylamine (0.8 ml), and a solution of 1.6N n-Butyllithium (3.1 ml) was added dropwise. After stirring 15 minutes, a solution of compound (9) (2.2 g) in THF (3.6 ml) which was cooled to −78° C. was added via cannula to the lithium diisopropylamine solution, and stirring was continued for 1 hour. At this point, dry ice was removed from the cooling bath, and the temperature allowed to rise to −5° C. over the next 2.5 hours. Upon reaching −5° C., the dry ice bath was replaced with an ice/salt bath regulated between −10° and −5° C. The mixture was stirred at this temperature for 3 hours. At this point, the flask was cooled to −94° C. (methanol/liquid N₂) and after stirring for 15 minutes, to allow thermal equilibration, a solution of t-butyl The step above can be accomplished using two different elimination methods.

Method I

To a flask charged with compound (10) (14.6 g) was added methanol (227 ml) and SeO₂ (2.0 g) at once, and stored for 15 minutes. At this point, 7.3 ml of 30% H₂O₂ was added at once. After storing 15 minutes, the product was extracted with 700 ml of CH₂Cl₂ and 400 ml of H₂O. The product was purified by flash column chromatography (10% EtOAC in petroleum ether). (89~95% yield).

Method II

A flask charged with compound (10) (791 mg) and freshly distilled methyl iodide (8 ml), was refluxed for 5.5 hours. Excess methyliodide was removed by rotary evaporation. The residue was dissolved in THF (4.2 ml).

A flask was charged with DBN (9.2 ml) and THF (4.2 ml) and the temperature was lowered to −78° C. To this DBN solution, the hydrazonium methodide solution was added slowly with vigorous stirring via cannula. Stirring was continued for 3 hours at −78° C., and the product was extracted with pentane and 1N NaHSO₄. The product (11) was purified by flash column chromatograph (63% yield).

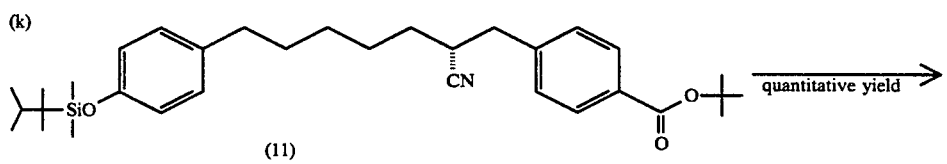

-continued

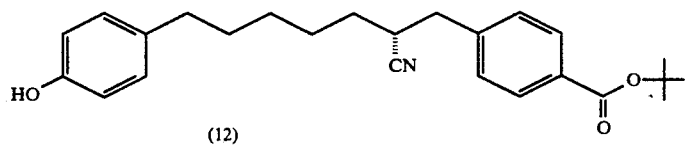
(12)

A flask was charged with compound (11) (2.2 g) and dry THF (17 ml). The solution's temperature was lowered to −78° C. and tetrabutyl ammonium fluoride (TBAF) (1N in THF) (6.1 ml) was added. After 2 hours stirring, another 1.5 ml of TRAF as added and stirred for 1 additional hour. The reaction was quenched with acetic acid (340 mg) in ether (34 ml) at −78° C. The product (12) was extracted with ether and H₂O. Evaporation of solvent gave sufficiently pure product for the next step.

(l)

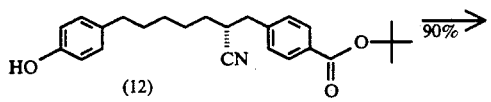
(12)

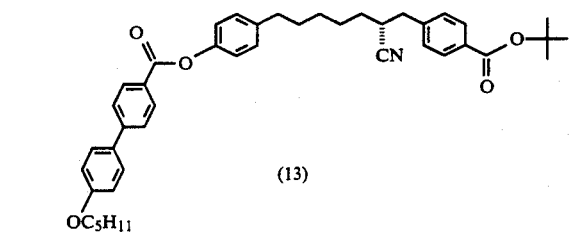
(13)

A flask was charged with 1.6 g of compound (12), 1.15 g of 4-pentoxy biphenyl carboxylic acid, 603 mg of dimethyl-p-toluidine sulfonate (DPTS) and 62 ml of CH₂Cl₂. To the suspended solution was added diisopropyl carbodiimide (DIPC) (1.1 ml), and the stirring was continued for 25 hours. The solid precipitate formed (urea) was removed, and the concentrated mixture (solid) (13) was purified by flash column chromatography (CH₂Cl₂).

(m)

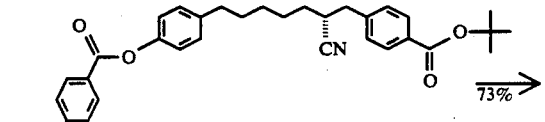
(13)

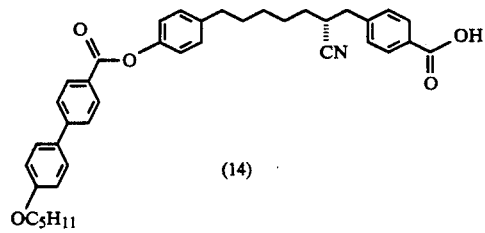
(14)

In a 10 ml flask, compound (13) was dissolved in 2 ml of CH₂Cl₂. 650 μl of CF₃COOH was added at room temperature, and stirring was continued for 2 hours. The solvent and CF₃COOH were removed by rotary evaporation and high vacuum in succession. The crude product (14) was purified by recrystallization (CH₂Cl₂→pentane).

(n)

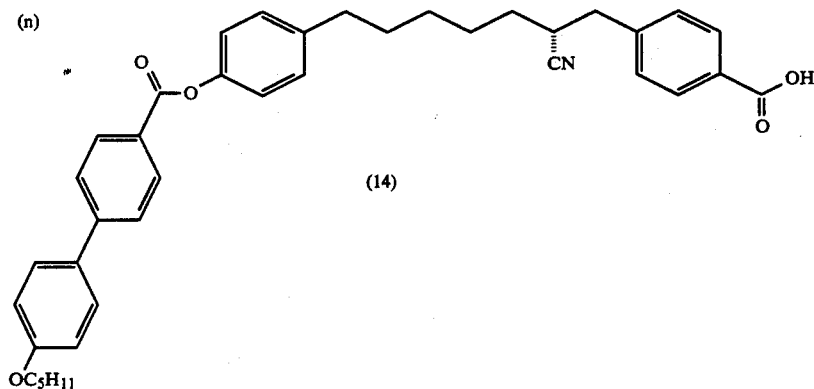
(14)

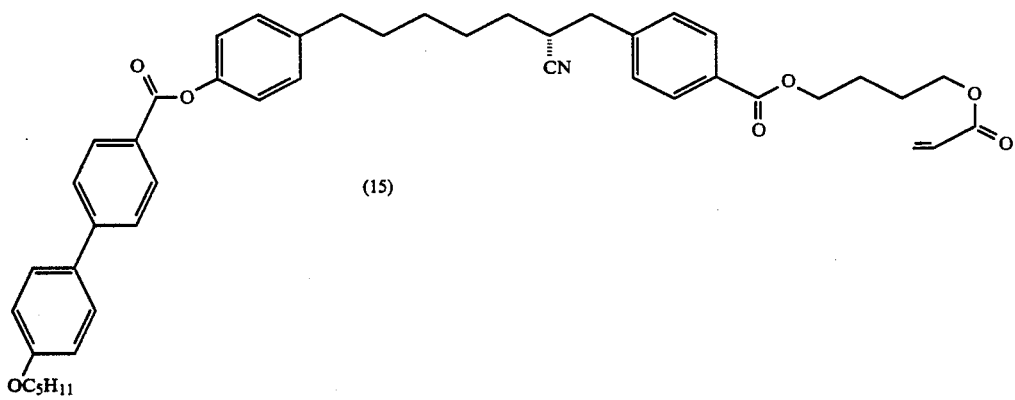

(15)

In an 80 ml flask, 280 mg of compound (14) and 80 mg of DPTS were dissolved in 4 ml of $CH_2Cl_2$. Then 0.2 ml of 4-hydroxybutylacrylate was added at once, followed by addition of 0.12 ml of DIPC. The reaction mixture was stirred for 24 hours at room temperature. The solid precipitate (urea) was removed by filtration, and the product (15) was purified by flash column chromatography ($CH_2Cl_2$), followed by purification by recrystallization ($CH_2Cl_2 \rightarrow$ pentane).

Polymer Synthesis

Preparation of the polymer requires the thermal polymerization of an appropriate monomer, e.g., that of formula I, by heating above the isotropization transition. The monomer of FIG. 1 melts into a smectic liquid crystal near 80° C. and becomes an isotropic liquid near 100° C. Temperatures up to 10° C. above the isotropization transition are found to be suitable for the thermal polymerization. In this temperature range, polymerization occurs rapidly and within 10 minutes or so the isotropic liquid reconverts to a smectic liquid crystal. At this point, the smectic liquid must be annealed for periods of time in the order of an hour before the desired product is formed.

Properties of the Polymer

The product obtained is birefringent at room temperature when examined under cross polars by optical microscopy and becomes isotropic sharply (within a few degrees) at temperatures near 240° C. The birefringence indicates that the product is either crystalline or liquid crystalline until the sharp isotropization transition occurs. Differential scanning calorimetry reveals a transition near 100° C. which is possibly a melting transition into a liquid crystalline substance. As the isotropization temperature is approached, the birefringent substance is viscous but can be sheared between glass slides indicating that is an ordered fluid. The product is very different from the comb polymer prepared from the same monomer by solution polymerization using azobisisobutyronitrile as initiator. This material is also crystalline but exhibits a broad isotropization transition in the range 150°-170° C., 70°-90° C. below the sharp isotropization transition of the product of this invention. The product of the invention contains some gel-like material, but the remainder is soluble in organic solvents such as chloroform. Evidence for the dual polymerization was obtained from both infrared and proton NMR spectroscopy. Infrared spectroscopy shows the disappearance of roughly 50% of the nitrile groups as indicated by a decrease in a nitrile to aromatic absorbance ratio from 0.207 to 0.125. The infrared spectrum of the product does not reveal the peak corresponding to carbon-carbon double bonds in acrylate groups as expected after the polymerization reaction. A large decrease of olefinic bonds was also indicated by proton NMR spectra of the product of interest.

From a general point of view, the discovery is important as an approach in materials chemistry to create two-dimensional structures analogous to the molecular membranes of cells through "a bulk reaction." Present methods known to create molecular membranes or their polymerized analogues would involve special dipping methods such as Langmuir-Blodgett techniques or special dispersions which form liposomes. Having access to structures of this architecture could have impact in a number of technological areas. One of the more obvious ones is their use as synthetic membranes in the form of thin films to separate gaseous or liquid substances. Since the molecular sheets described herein are chiral, a specific use would be as membranes for the separation of racemic mixtures into pure enantiomers; this would be of great interest to the pharmaceutical industry. The membranes would be very easy to prepare since there two-dimensional polymers form highly plastic smectic phases which could be processed as thin films.

The newly-discovered materials were also found to exhibit strong second order nonlinear optical susceptibility of remarkable temporal stability. The stability of nonlinear optical properties could be linked directed to the two-dimensional nature of the molecular architecture. We have monitored for one year the intensity of the second harmonic beam generated after an infrared laser bean is passed through a poled thin film and no changes have been detected so far. For this reason, the new materials discovered can have impact in technological applications related to nonlinear optics. In this emerging area, new materials are utilized to double the frequency of laser beams or change the refractive index of light through electrical pulses. The materials that have the nonlinear properties must be shaped as waveguides in electro-optical devices that store, transmit, and process information. These devices could play a role in the development of powerful computers as well as new telecommunication systems. One critical property that materials for these technologies must have s the temporal stability of molecular configurations giving rise to nonlinear properties. Industrial laboratories have specified that materials must remain field responsive for period of five years or more. The only materials known so far that have reasonable stability are glassy crosslinked polymers such as epoxies, but these would not be ideal systems due to a number of difficulties in terms of processing and aging. The materials we have synthesized recently have potential because their nonlinear optical activity has remarkable stability and also because the layered structures they form can be processed into monodomains with external magnetic fields. These monodomains are important because they reduce the light scattering that must be avoided in the waveguides of opto-electronic devices. A family of materials identified as having potential in this area are polymeric glasses doped with organic dyes. These polymeric glasses include poly(methyl methacrylate) or polycarbonate and are considered potentially useful because of their high transparency. However, poling of dye molecules dispersed in these glassy matrices is the factor responsible for the nonlinear properties and orientation relaxation is observed with time.

The foregoing detailed description has been given for clearness of understanding only, and no unnecessary limitations should be understood therefrom, as modifications will be obvious to those skilled in the art.

What is claimed is:

1. A two-dimensional polymer prepared by thermal polymerization in bulk of a monomer having at least two reactive groups spaced along its length, not more than one of said groups being located sufficiently close to a terminus of said monomer to permit intermolecular reaction with a similar two-dimensional polymer, and one or more affinity groups which cause said monomer to assume ordered aligned configurations whereby reaction of said reactive groups causes the creation of at least two sets of bonds among said monomers, said sets lying in separate spaced planes.

2. A polymer in accordance with claim 1 wherein said reactive groups are selected from the group consisting of vinyl, acrylate, methacrylate, benzylic, epoxide, and nitrile.

3. A polymer in accordance with claim 1 wherein said affinity groups are selected from highly hydrophobic or hydrophilic groups, or groups containing a chiral center.

4. A method for forming a two-dimensional polymer which comprises heating a monomer having at least two reactive groups spaced along its length, not more than one of said groups being located at a terminus of said monomer, and one or more affinity groups which cause said monomers to assume ordered aligned configurations whereby reaction of said reactive groups causes the creation of at least two sets of bonds among said monomers, said sets lying in separate spaced planes.

5. A method in accordance with claim 4 wherein said reactive groups are selected from the group consisting of vinyl, acrylate, methacrylate, benzylic, epoxide, and nitrile.

6. A method in accordance with claim 4 wherein said affinity groups are selected from highly hydrophobic or hydrophilic groups, or groups containing a chiral center.

7. A two-dimensional polymer prepared by thermal polymerization in bulk of a monomer having the structure

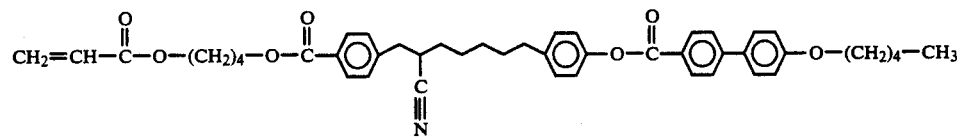

to assume ordered aligned configurations whereby reaction of said reactive groups causes the creation of at 8. A method for forming a two-dimensional polymer which comprises heating a monomer having the structure:

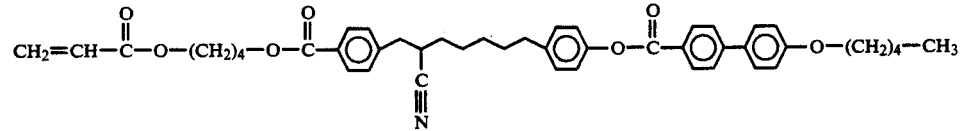

* * * * *